US012049780B2

(12) United States Patent
Fritsch

(10) Patent No.: US 12,049,780 B2
(45) Date of Patent: Jul. 30, 2024

(54) ACTUATOR FOR A SIDE DOOR OF A MOTOR VEHICLE WITH HOLDING FUNCTION

(71) Applicant: Vitesco Technologies GMBH, Regensburg (DE)

(72) Inventor: Karl Martin Fritsch, Frankfurt (DE)

(73) Assignee: VITESCO TECHNOLOGIES GmbH, Regensburg (DE)

( * ) Notice: Subject to any disclaimer, the term of this patent is extended or adjusted under 35 U.S.C. 154(b) by 91 days.

(21) Appl. No.: 17/752,738

(22) Filed: May 24, 2022

(65) Prior Publication Data

US 2022/0282547 A1 Sep. 8, 2022

Related U.S. Application Data

(63) Continuation of application No. PCT/EP2020/077847, filed on Oct. 5, 2020.

(30) Foreign Application Priority Data

Nov. 25, 2019 (DE) ........................ 102019218172.4

(51) Int. Cl.
*E05F 15/614* (2015.01)
*E05F 15/63* (2015.01)

(52) U.S. Cl.
CPC ......... *E05F 15/63* (2015.01); *E05Y 2201/418* (2013.01); *E05Y 2900/531* (2013.01)

(58) Field of Classification Search
CPC .. E05F 15/63; E05F 15/614; E05Y 2201/418; E05Y 2201/434; E05Y 2900/531; E05Y 2400/202; E05Y 2400/25
USPC .................................................. 49/333, 334
See application file for complete search history.

(56) References Cited

U.S. PATENT DOCUMENTS

| | | | | |
|---|---|---|---|---|
| 4,698,560 A * | 10/1987 | Andrei-Alexandru | E05B 77/48 | 180/289 |
| 6,148,967 A * | 11/2000 | Huynh | H02K 49/06 | 188/164 |
| 7,045,985 B2 * | 5/2006 | Huang | B60L 7/16 | 318/362 |
| 9,260,901 B2 * | 2/2016 | Ishida | E05F 15/655 | |

(Continued)

FOREIGN PATENT DOCUMENTS

| | | | |
|---|---|---|---|
| CN | 101680262 A | 3/2010 | |
| DE | 102004061687 A1 * | 7/2006 | E05C 17/30 |

(Continued)

OTHER PUBLICATIONS

Chinese Office Action dated Feb. 3, 2023 for corresponding Chinese Patent Application No. 202080070260.X.

*Primary Examiner* — Jerry E Redman

(57) ABSTRACT

An actuator for a side door of a motor vehicle is described, which brings about automatic opening or closing of the side door depending on a signal and has a device for holding the side door in any open position. The holding device is realized by a function of the electric motor itself, according to which function the control device initiates a short-circuit function of the motor phases when the motor is activated, which causes a high current flow and thus a high torque for holding the side door open. By short-circuiting the motor phases, no additional components are required, since this is a special activation function of the motor.

5 Claims, 3 Drawing Sheets

(56) References Cited

U.S. PATENT DOCUMENTS

| | | | | |
|---|---|---|---|---|
| 9,353,566 | B2 * | 5/2016 | Miu | B60J 5/0472 |
| 9,845,631 | B2 * | 12/2017 | Eggeling | E05F 15/622 |
| 10,392,849 | B2 * | 8/2019 | Xiao | E05F 15/611 |
| 10,415,286 | B1 * | 9/2019 | Porcella | E05D 11/10 |
| 10,626,659 | B2 * | 4/2020 | Herrmann | E05F 15/616 |
| 10,718,148 | B2 * | 7/2020 | Ghannam | E05B 81/76 |
| 10,801,246 | B2 | 10/2020 | Elie et al. | |
| 11,199,039 | B2 | 12/2021 | Zander et al. | |
| 11,286,702 | B2 * | 3/2022 | Krushel | E05F 15/616 |
| 11,365,578 | B2 * | 6/2022 | Bakos | E05F 15/611 |
| 2010/0301785 | A1 * | 12/2010 | Davis | B60T 13/743 318/365 |
| 2011/0271595 | A1 | 11/2011 | Eggeling | |
| 2013/0239485 | A1 * | 9/2013 | Reed | E05F 5/025 49/386 |
| 2014/0245666 | A1 | 9/2014 | Ishida | |
| 2015/0240548 | A1 * | 8/2015 | Bendel | E05F 5/00 701/49 |
| 2017/0030132 | A1 * | 2/2017 | Elie | E05F 15/70 |
| 2018/0202212 | A1 * | 7/2018 | Xiao | E05F 3/00 |
| 2018/0334841 | A1 * | 11/2018 | Langenberg | E05F 15/611 |
| 2022/0307316 | A1 | 9/2022 | Soderqvist | |
| 2023/0110103 | A1 * | 4/2023 | Kim | E05F 15/614 49/334 |
| 2023/0112987 | A1 * | 4/2023 | Kim | E05F 15/614 49/334 |

FOREIGN PATENT DOCUMENTS

| | | | | |
|---|---|---|---|---|
| DE | 102017201955 | A1 * | 8/2018 | E05F 15/40 |
| DE | 102017207556 | A1 * | 11/2018 | E05C 17/003 |
| DE | 102017207556 | A1 | 11/2018 | |
| EP | 0914537 | B1 * | 5/2000 | |
| GB | 1156890 | A | 7/1969 | |
| JP | 11324482 | A | 11/1999 | |

* cited by examiner

ACTUATOR FOR A SIDE DOOR OF A MOTOR VEHICLE WITH HOLDING FUNCTION

CROSS-REFERENCE TO RELATED APPLICATIONS

This application claims priority to PCT Application PCT/EP2019/077847, filed Oct. 5, 2020, which claims priority to German Patent Application No. DE 10 2019 218 172.4, filed Nov. 25, 2019. The disclosures of the above applications are incorporated herein by reference.

FIELD OF THE INVENTION

The present invention relates to an actuator for a side door of a motor vehicle, which brings about automatic opening or closing of the side door depending on a signal, having an electric motor which is activated by the signal via a control device and which, depending on the signal, generates a torque which acts on a hinge of the side door via a transmission, and a device for holding the side door in any open position.

BACKGROUND OF THE INVENTION

Motor vehicle doors that are not provided with an actuator are opened or closed by operation of the door handle and exertion of pressure against the door. In the open position, in addition to an end position, the door assumes certain holding (latching) positions in which the door movement is stopped and a corresponding resistance has to be overcome for further movement. In order to realize these holding positions, the door opening and closing mechanism is provided with certain additional devices, such as brakes, blocking devices and the like. The arrangement of such devices is correspondingly complicated.

Furthermore, motor vehicle doors are known which are provided with corresponding actuators. Such an actuator for a side door of a motor vehicle is described in the introduction. It brings about automatic opening and closing of the side door when a signal is activated by operation of the door handle, a push button on the dashboard or by activation via radio, etc. In this case, the signal activates an electric motor of an actuator via a control device, which, depending on the signal, generates a torque which acts on a hinge of the side door via a transmission. The door is opened or closed in this way, this being able to be carried out in any position, for example an end position or any intermediate position. A suitable sensor device here can specify the door position to be achieved, for example.

Even in the case of doors of this type that are provided with an actuator, it is known to generate certain holding points for keeping the door open, for which purpose, for example, additional braking devices, etc., are provided, which can be provided in addition to the actuator or within the actuator.

SUMMARY OF THE INVENTION

The present invention is based on the object of providing an actuator of the type described in the introduction, the holding mode of which is activated easily.

According to the invention, this object is achieved in an actuator of the type specified in that the holding device is realized by a function of the electric motor itself, according to which function the control device initiates a short-circuit function of the motor phases when the motor is activated, which causes a high current flow and thus a high torque for holding the side door open.

In the solution according to the invention, the door holding function is realized by short-circuiting motor phases via the control device (activation electronics). This implements a short-circuit function in the associated software. By short-circuiting the motor phases, the motor holds the doors in the desired open position at a high torque, with no additional energy being required for this. The short circuit induces a current in the motor phases, which generates the torque of the motor.

Thus, if the door is to be kept open in a specific open position, an active short circuit between the individual phases of the motor is initiated according to the invention via the control device. This short circuit leads to a high current flow and thus to a high torque of the motor. The motor moves a small distance and is then held. This holding torque is greater than the force which is applied to the door and which causes the door to move.

By short-circuiting the motor phases, no additional components are required. On the contrary, this involves a control function (software function). Since the short circuit is set very quickly, the entire procedure is distinguished by high dynamics. No movable parts have to be provided for this purpose.

Certain holding positions of the door may therefore be achieved and maintained without special additional devices, such as braking devices, blocking devices and the like having to be provided in the actuator or in addition to the actuator.

The actuator configured according to the invention therefore has no additional device securing a holding position of the door; instead, the electric motor itself secures the holding position by exerting a correspondingly high holding torque by phase short-circuiting. The door therefore cannot readily move further and, as in the prior art described in the introduction, takes up a latching position.

The actuator configured according to the invention is fastened to the vehicle body in the region of the door hinge and outputs the torque of its electric motor via a suitable transmission to the door hinge in order to rotate same. Here, for example, a bolt in the door hinge is rotated such that the door is opened or closed. The door may be opened up to a maximum angle of 70°, for example. Corresponding holding positions of the door correspond to defined holding positions or else to holding positions determined by a corresponding sensor system.

The electric motor is embodied as a three-phase motor, and in an embodiment as a brushless direct-current motor.

In the embodiment which is described here and in which the holding mode is initiated by short-circuiting, the cogging torque of the electric motor (starting torque when stationary) is of only minor importance, if of any importance at all, and therefore the electric motor has a minimized cogging torque, since its holding effect should not affect the corresponding short-circuit function.

As already mentioned, a sensor device which specifies specific holding positions of the side door is provided, the signal of which initiates the holding function in a specific open position of the door. For example, the sensor device detects an obstacle and brings about a corresponding initiation of the holding position by short-circuiting, by supplying a signal to the control device.

The torque exerted by the motor after short-circuiting is transformed into a corresponding holding torque for the door via a corresponding transmission of the actuator. The transmission may be configured in such a way that the corresponding torque of the electric motor is increased and results in an increased holding torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail below with reference to an exemplary embodiment in conjunction with the drawing, in which.

DETAILED DESCRIPTION OF THE PREFERRED EMBODIMENTS

The following description of the preferred embodiment(s) is merely exemplary in nature and is in no way intended to limit the invention, its application, or uses.

The exemplary embodiment described here involves an actuator for a side door of a motor vehicle, which, depending on a signal, causes the side door to open or close automatically. The actuator has an electric motor which is activated by the signal via a control device and which, depending on the signal, generates a torque which acts on a hinge of the side door via a transmission.

Figure 1:
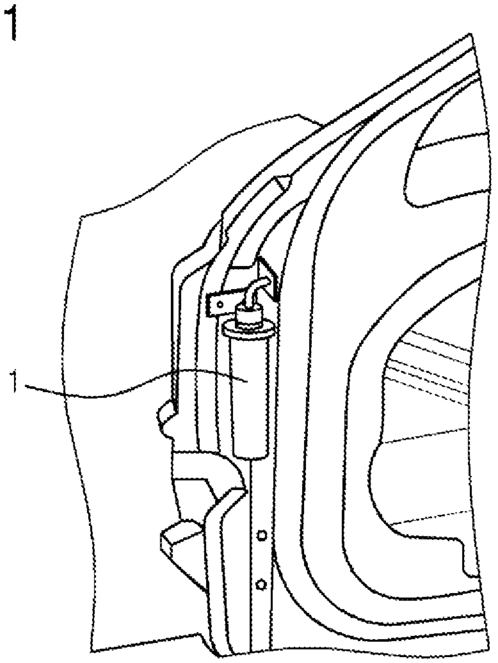
FIG. 1 shows an exemplary embodiment of an actuator which is installed in a motor vehicle.

FIG. 1 shows the actuator 1 installed on the A-pillar of a motor vehicle.

Figure 2:
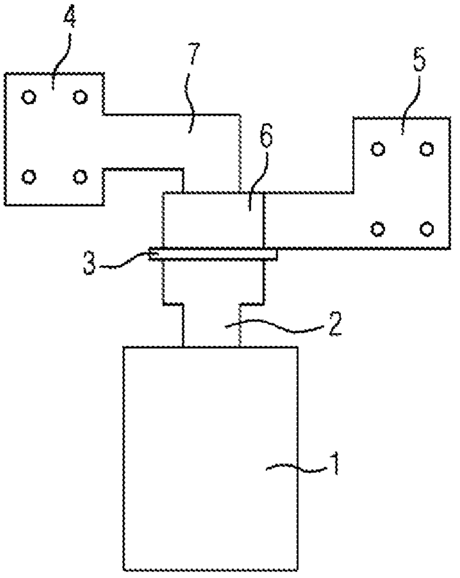
FIG. 2 shows a highly schematized side view of the actuator.

FIG. 2 shows the actuator 1 in a highly schematized side view. The actuator 1 has an electric motor (not specifically shown) which has a drive shaft 2 which extends upward in the figure and exerts a corresponding torque. The shaft 2 actuates a rotary arm 6 which is mounted on a sliding element 3 and is fastened in a vehicle door. The corresponding mechanism is held via an arm 7 fastened to the A-pillar of a motor vehicle, as shown at 4.

Rotation of the motor shaft 2 therefore causes the rotary arm 6 to pivot and thus opens or closes the vehicle door.

Figure 3:
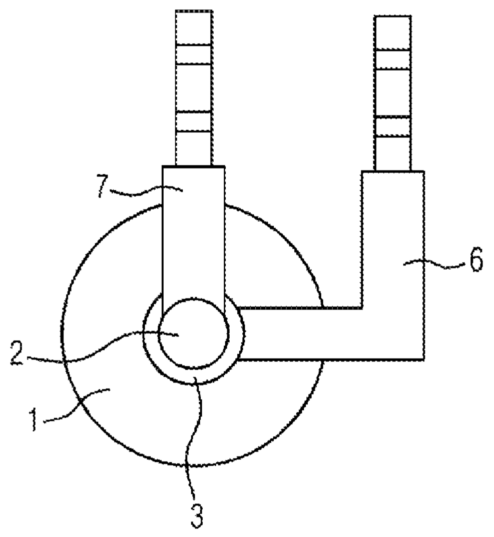
FIG. 3 shows a highly schematized top view of the actuator in the closed position of the door.
Figure 4:
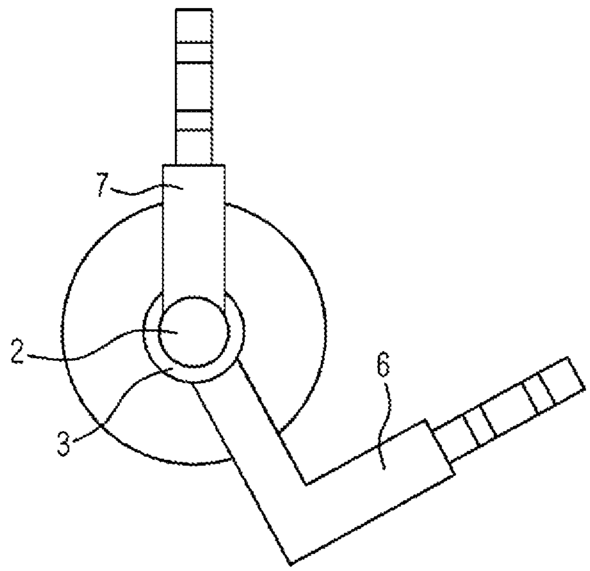
FIG. 4 shows a highly schematized top view of the actuator when the door is open.

FIGS. 3 and 4 each show a schematized top view of the actuator 1 with a corresponding actuating mechanism (transmission) for the vehicle door, with FIG. 3 showing the arm 6 with the door closed and FIG. 4 showing the arm 6 with the door open.

The actuator 1 shown and described here also has a device for holding the vehicle side door in any open position, which is realized by a function of the electric motor itself. In this case, the electric motor together with the control device is configured in such a way that the door holding function is realized by short-circuiting the motor phases via the control device (activation electronics). The motor controller therefore has a short-circuit function. Such a short circuit is deliberately brought about, as a result of which the motor holds the door in the desired position with a high torque. The short circuit induces a current in the motor phases, the current generating the corresponding torque of the motor, which is used here, optionally increased via a transmission, as a holding torque.

Figure 5:
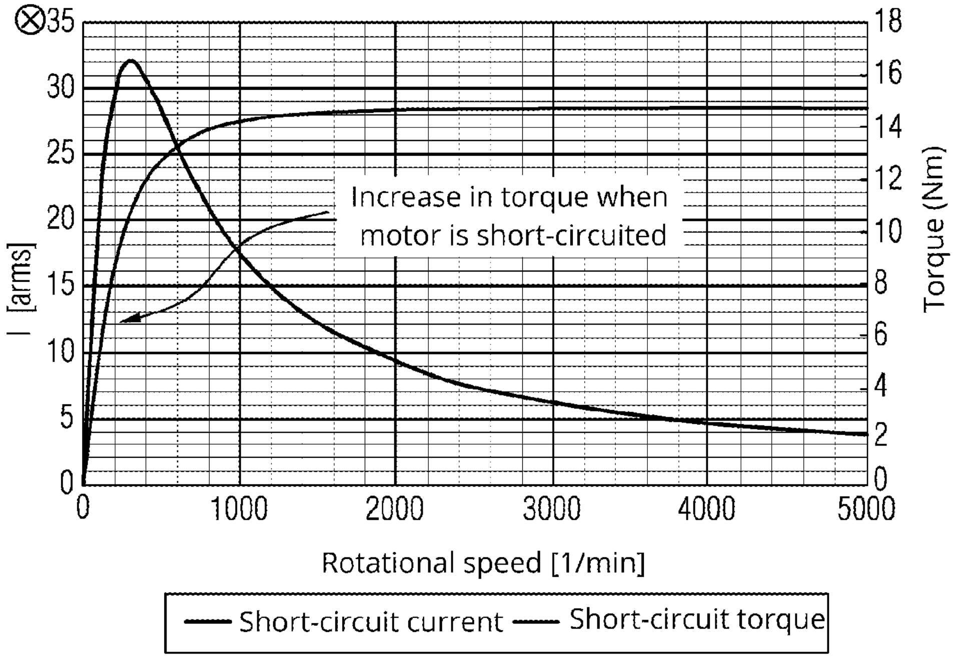
FIG. 5 shows a diagram showing the increase in torque when the motor is short-circuited.

FIG. 5 shows a diagram of the increase in torque when the motor is short-circuited, with the corresponding short-circuit torque and the corresponding short-circuit current being shown. It is seen that the short-circuiting of motor phases results in a significant increase in motor torque, which ensures the corresponding holding function of the door.

By skillful configuration of the short-circuit torque, the holding function of the door is thus fulfilled.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An actuator for a side door of a motor vehicle, which brings about automatic opening or closing of the side door depending on a signal, comprising:
- a transmission;
- an electric motor which is activated by the signal via a control device and which, depending on said signal, generates a first torque which acts on a hinge of the side door via the transmission; and
- a holding device for holding the side door in an open position, the holding device further comprising:
  - a short-circuit function of the electric motor;
  - wherein according to the function, the control device initiates the short-circuit function of the electric motor phases when the electric motor is activated, which causes a high current flow and thus a second torque, holding the side door open, the second torque being higher than the first torque.

2. The actuator of claim 1, the electric motor further comprising a three-phase motor.

3. The actuator of claim 1, the electric motor further comprising a brushless direct-current motor.

4. The actuator of claim 1, wherein the electric motor has a minimized cogging torque.

5. The actuator of claim 1, further comprising a sensor device which specifies specific holding positions of the side door.

* * * * *